US010228286B2

(12) United States Patent
Su et al.

(10) Patent No.: US 10,228,286 B2
(45) Date of Patent: Mar. 12, 2019

(54) DISPLAY DEVICE

(71) Applicant: Qisda Corporation, Taoyuan (TW)

(72) Inventors: Yung-Chun Su, New Taipei (TW);
Ying-Tsung Tsai, Taoyuan (TW);
Ming-Yuan Hung, Taoyuan (TW);
Chih-Wei Tien, Taoyuan (TW);
Hung-Hsun Liu, Taoyuan (TW);
Chun-Jung Tsuo, Taoyuan (TW);
Kai-Wei Huang, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/791,506

(22) Filed: Oct. 24, 2017

(65) Prior Publication Data

US 2018/0120163 A1   May 3, 2018

(30) Foreign Application Priority Data

Oct. 28, 2016   (CN) .......................... 2016 1 0969278

(51) Int. Cl.
| | |
|---|---|
| *G01N 21/00* | (2006.01) |
| *G01J 3/50* | (2006.01) |
| *G01J 3/02* | (2006.01) |
| *G09G 5/00* | (2006.01) |
| *G09G 5/02* | (2006.01) |

(52) U.S. Cl.
CPC ............ *G01J 3/506* (2013.01); *G01J 3/0202* (2013.01); *G01J 3/0291* (2013.01); *G09G 5/003* (2013.01); *G09G 5/02* (2013.01); *G09G 2320/029* (2013.01); *G09G 2320/0666* (2013.01)

(58) Field of Classification Search
CPC .... G01J 3/50; G09G 5/00; G09G 5/02; G09G 5/2003; G09G 3/20; H05K 7/00; H05K 7/02; H05K 7/20; F16M 13/00; F16M 11/04
See application file for complete search history.

(56) References Cited

U.S. PATENT DOCUMENTS

| | | |
|---|---|---|
| 2014/0192077 A1 | 7/2014 | Gomi et al. |
| 2015/0371581 A1* | 12/2015 | Chuman .................. G09G 5/00 345/593 |

OTHER PUBLICATIONS

Office action of counterpart application by Taiwan IP Office dated Mar. 16, 2017.

* cited by examiner

*Primary Examiner* — Abdullahi Nur

(57) ABSTRACT

A display device including a housing, a display module, a carrier and a color correction module is provided. The display module is disposed in the housing and exposes a display plane, which faces a first direction vertical to the display plane. The carrier is movably connected to the housing and disposed outside the housing or disposed on a back side of the display module. The back side faces to a second direction opposite to the first direction. The color correction module is disposed on the carrier and has a sensing face. The carrier is selectively disposed at a first position or a second position with respect to the housing. When the carrier is at the second position, the sensing face of the color correction module is moved to face the display plane.

14 Claims, 13 Drawing Sheets

DISPLAY DEVICE

This application claims the benefit of People's Republic of China application Serial No. 201610969278.9, filed Oct. 28, 2016, the subject matter of which is incorporated herein by reference.

BACKGROUND OF THE INVENTION

Field of the Invention

The invention relates in general to a display device, and more particularly to a display device with color correction function.

Description of the Related Art

Very few of the display devices currently available in the market are equipped with color correction function. Normally, the users have to purchase an external color correction module.

For the users, this would cost them extra money to purchase a color correction module. Furthermore, since the stability of the hand-held color correction module is poor, the correction quality is affected. Besides, each time when the hand-held color correction module is used, its position needs to be corrected, and this is very inconvenient to the user. Furthermore, if the correction position of the color correction module is incorrect, the sensor of the color correction module, being interfered with by an ambient light, may detect unnecessary information and the correction quality of the display device will be affected.

SUMMARY OF THE INVENTION

The invention is directed to a display device having a movable carrier and a color correction module. The sensing face of the color correction module can be moved to face the display plane through the movable carrier.

According to one embodiment of the present invention, a display device including a housing, a display module, a carrier and a color correction module is provided. The display module is disposed in the housing and exposes a display plane, which faces to a first direction vertical to the display plane. The carrier is movably connected to the housing and disposed outside the housing or disposed on a back side of the display module. The back side faces to a second direction opposite to the first direction. The color correction module is disposed on the carrier and has a sensing face. The carrier is selectively disposed at a first position or a second position with respect to the housing. When the carrier is at the second position, the sensing face of the color correction module is moved to face the display plane.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention.

First Embodiment

Figure 1:
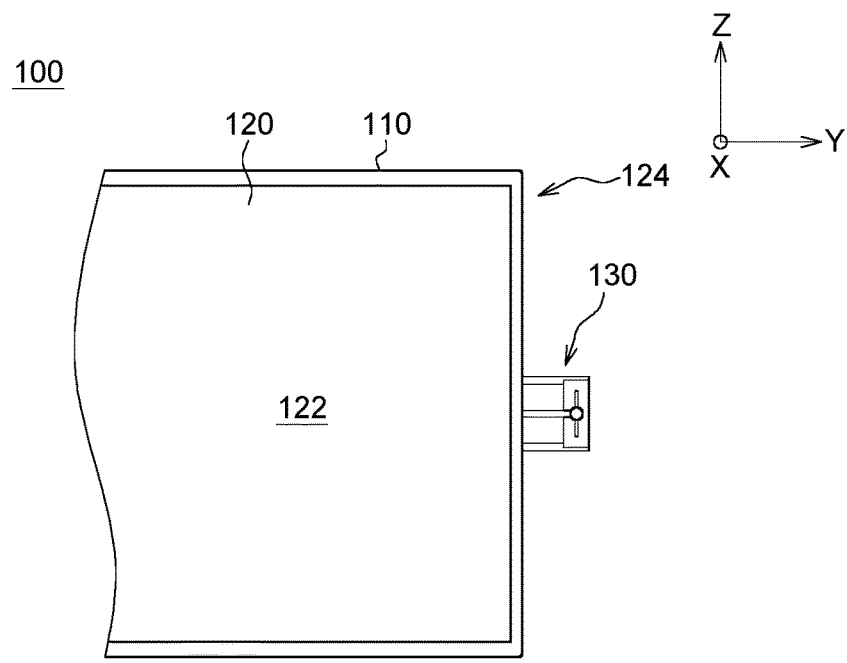
FIGS. 1-6 are schematic diagrams of the operation and components of a display device according to a first embodiment of the invention.
Figure 2:
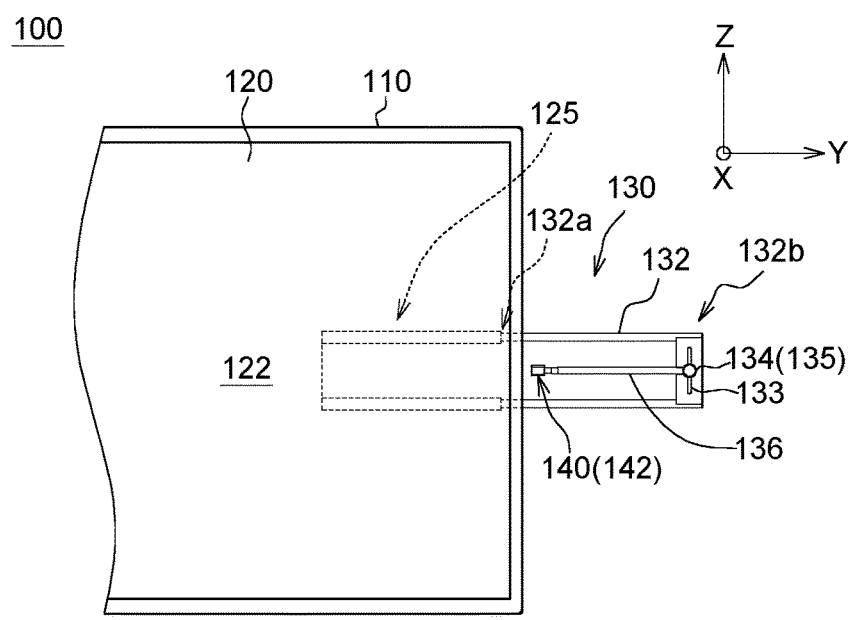

FIGS. 1~6 are schematic diagrams of the operation and components of a display device 100 according to a first embodiment of the invention. For the convenience of description, only the right-hand side of the display device 100 is illustrated in the diagrams. However, the carrier 130 is not restricted to be disposed on the right-hand side of the display device 100, and can also be disposed on the left-hand side, the top or the bottom of the display device 100. Refer to FIGS. 1 and 2. The display device 100 includes a housing 110, a display module 120, a carrier 130 and a color correction module 140. The housing 110 can be a hollowed rectangle and has a back plate covering the back side of the display module 120. The display module 120 is disposed in the housing 110 and exposes a display plane 122 facing a first direction (that is, facing +X direction vertical to the paper) vertical to the display plane 122. The color correction module 140 is disposed on the carrier 130 and has a sensing face 142 used for correcting the color, the color temperature or the color difference of the display module 120.

The carrier 130 is disposed on a back side 124 of the display module 120. The back side 124 faces to a second direction (that is, facing −X direction vertical to the paper) opposite to the first direction. In an embodiment, the back side 124 of the display module 120 has a recess 125 (refer to FIG. 2), and the carrier 130 can be inserted into the recess 125 (such as a rectangular recess) interposed between the back side 124 of the display module 120 and the back plate of the housing 110 through a long rod (or a telescopic rod). The long rod slides in the recess 125, such that the carrier 130 can be received in the back side 124 of the display module 120 or extended outside the housing 110.

Figure 3:
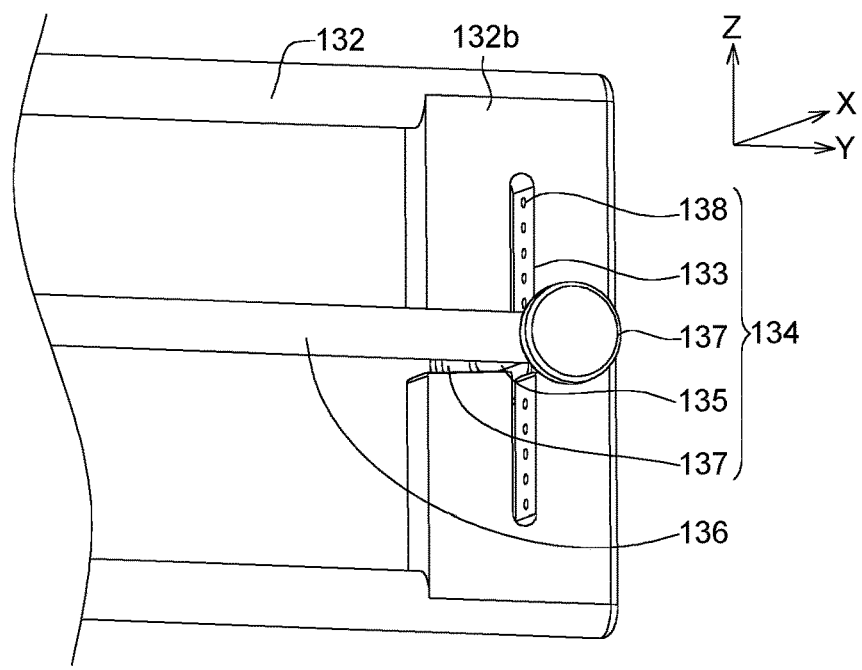

Refer to FIG. 1. When the carrier 130 slides leftwards (the −Y direction), the carrier 130 is at the first position and at least partly received in the back side 124 of the display module 120. Refer to FIG. 2. When the carrier 130 slides rightwards (the +Y direction), the carrier 130 is extended outside the housing 110 form the recess 125. Refer to FIGS. 1-4. In an embodiment, the carrier 130 includes a moving structure 132, a sliding structure 134 and a rotation structure 136. The moving structure 132 can be a long rod or a telescopic rod disposed on the back side 124 of the display module 120. The moving structure 132 has a first end 132*a* and a second end 132*b*. The first end 132*a* is connected to the back side 124 of the display module 120. The second end 132*b* is extended outside the housing 110 with respect to the first end 132*a*. The sliding structure 134 is disposed at the second end 132*b* of the moving structure 132. The sliding structure 134 has a sliding recess 133 and a sliding rod 135 located in the sliding recess 133. The sliding rod 135 can move along the first direction or the second direction (that is, moving upwards and downwards along the X direction vertical to the paper). As indicated in FIG. 3, each of the two ends of the sliding rod 135 connects a protruded disk 137 whose diameter is greater than the width of the sliding recess 133 for limiting the scope of movement of the sliding rod 135 in the first direction or the second direction. Besides, the sliding rod 135 is inserted into the sliding recess 133 and the outer diameter of the sliding rod 135 is substantially equivalent to or slightly smaller than the width of the sliding recess 133. Although the sliding rod 135 can change its position along the extending direction of the sliding recess 133, the sliding rod 135 and the sliding recess 133 are tightly fitted to enhance the positioning effect. Refer to FIG. 3. In an embodiment, the sliding recess 133 has a plurality of positioning points 138 disposed therein. Each positioning point 138 can be a protrusion, a notch, an anti-sliding pad, or any of a protruded structure, an indented structure or an elastic structure with shrinking function. The sliding rod 135 can be engaged with any one of the positioning points 138 to be positioned in the sliding recess 133. Or, the sliding rod 135 can be engaged between any two adjacent positioning points 138 to be positioned in the sliding recess 133 to enhance the positioning effect.

Figure 4:
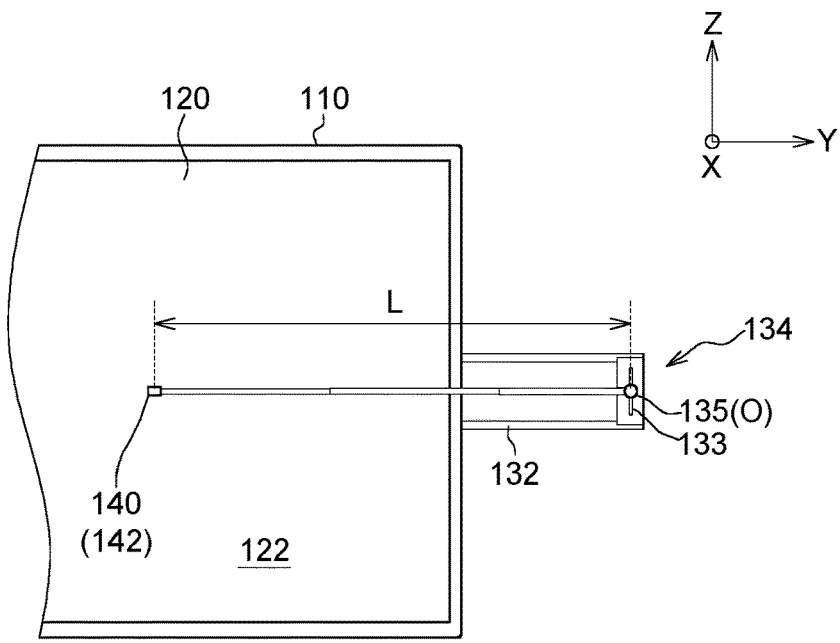

Refer to FIGS. 2 and 4. The rotation structure 136 is disposed on the sliding rod 135 and movably connected to the color correction module 140 and the sliding rod 135. The rotation structure 136 can be a telescopic rod whose one end is fixedly or pivotally connected to the sliding rod 135 and the other end is fixedly connected to the color correction module 140. As indicated in FIG. 2, the rotation structure 136 is shorter because the end through which the rotation structure 136 is connected to the color correction module 140 does not extend leftwards. As indicated in FIG. 4, when the carrier 130 is at the second position (that is, the working position), the end through which the rotation structure 136 is connected to the color correction module 140 extends leftwards, so the length L of the rotation structure 136 is increased, and the sensing face 142 of the color correction module 140 can be moved to face the display plane 122.

As indicated in FIGS. 1 and 2, the display plane 122 of the display module 120 faces to the first direction (that is, the +X direction), and the sensing face 142 of the color correction module 140 faces to the second direction (that is, the −X direction). That is, the sensing face 142 of the color correction module 140 and the display plane 122 of the display module 120 are misaligned or the sensing face 142 and the display plane 122 are back-to-back. As indicated in FIG. 4, when the sliding rod 135 moves along the first direction and moves the color correction module 140 to the front side from the back side 124 of the display module 120, the color correction module 140 can be extended inwards through the rotation structure 136 to overlap with the display plane 122 from the outer side of the housing 110 or the outer side of the display plane 122. Thus, the sensing face 142 of the color correction module 140 can be moved to face the display plane 122 of the display module 120 from the back side 124 of the display module 120 to perform color correction.

Figure 5:
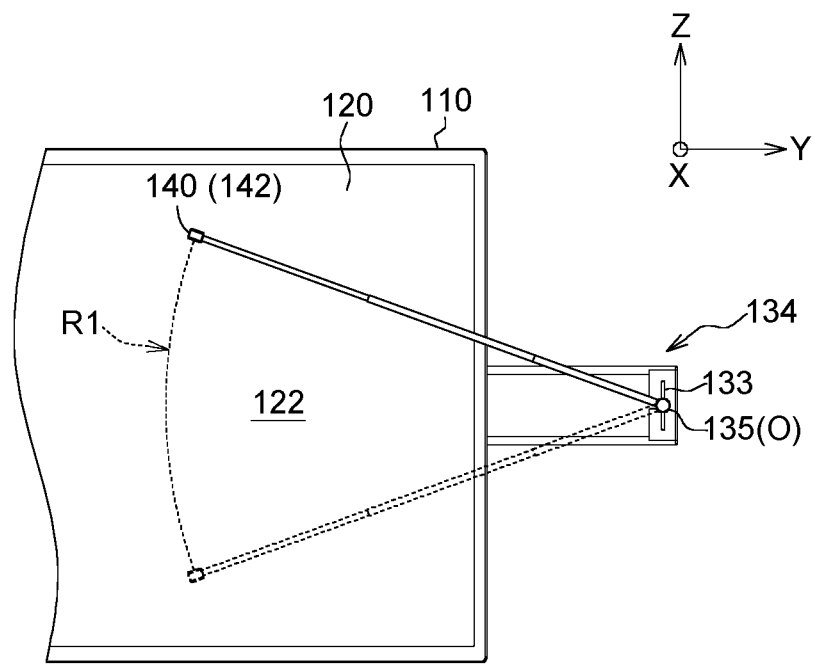

Refer to FIG. 5. The rotation structure 136 can rotate around the first direction (that is, the +X direction) to form an arc trajectory R1 using the length L as the radius. The rotation structure 136 translates the sensing face 142 of the color correction module 140 with respect to display plane 122 to detect the color at each detection point on the arc trajectory R1 to complete color correction.

Figure 6:
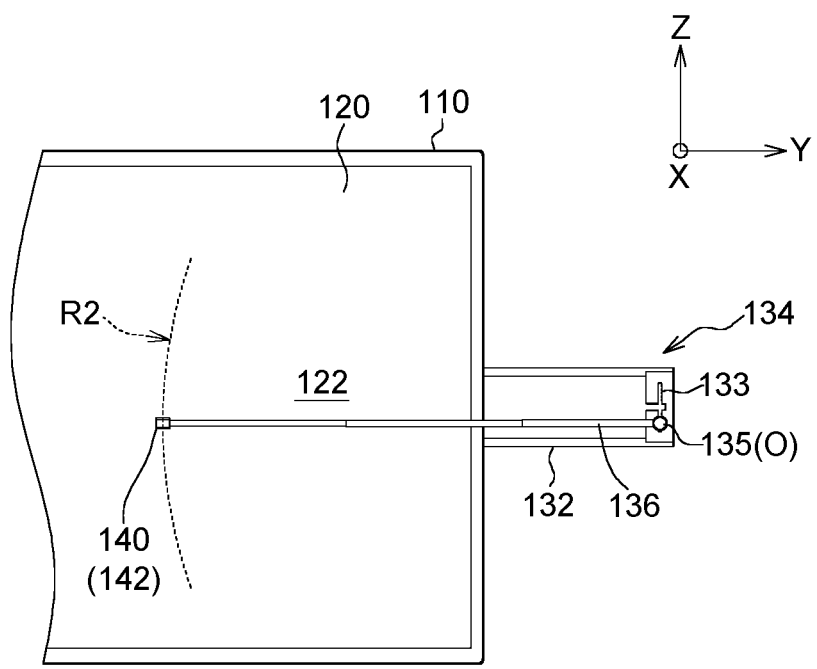

Refer to FIG. 6. The end through which the rotation structure 136 is connected to the sliding rod 135 (that is, the circle center O) can move along the extending direction of the sliding recess 133 to change the vertical position of the rotation structure 136. The sensing face 142 of the color correction module 140 is opposite to the display plane 122 and can be translated on another arc trajectory R2 to detect the color at each detection point on the arc trajectory R2. Moreover, by changing the length L of the rotation structure 136, the display device 100 of the present embodiment can change the radius of each of the arc trajectories R1 and R2 to perform color correction to other display regions.

Second Embodiment

Figure 7:
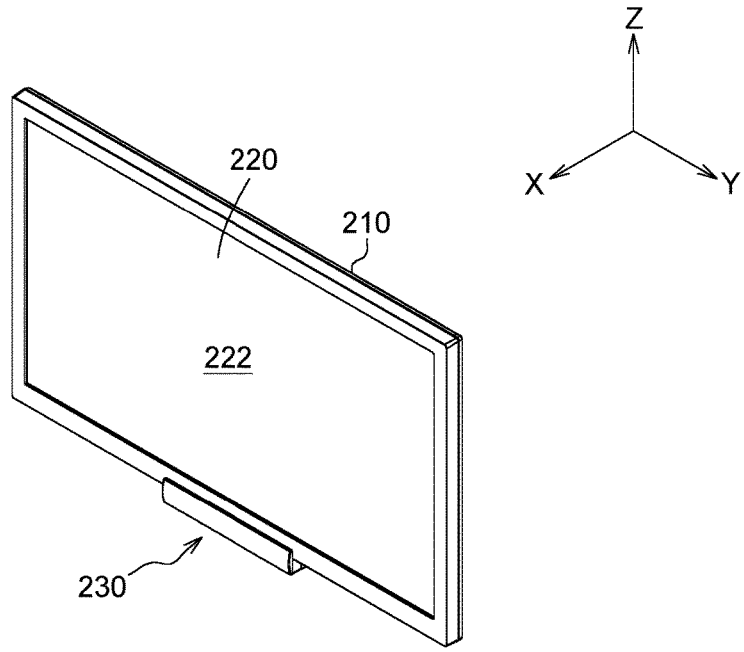
FIGS. 7-11 are schematic diagrams of the operation and components of a display device according to a second embodiment of the invention.
Figure 8:
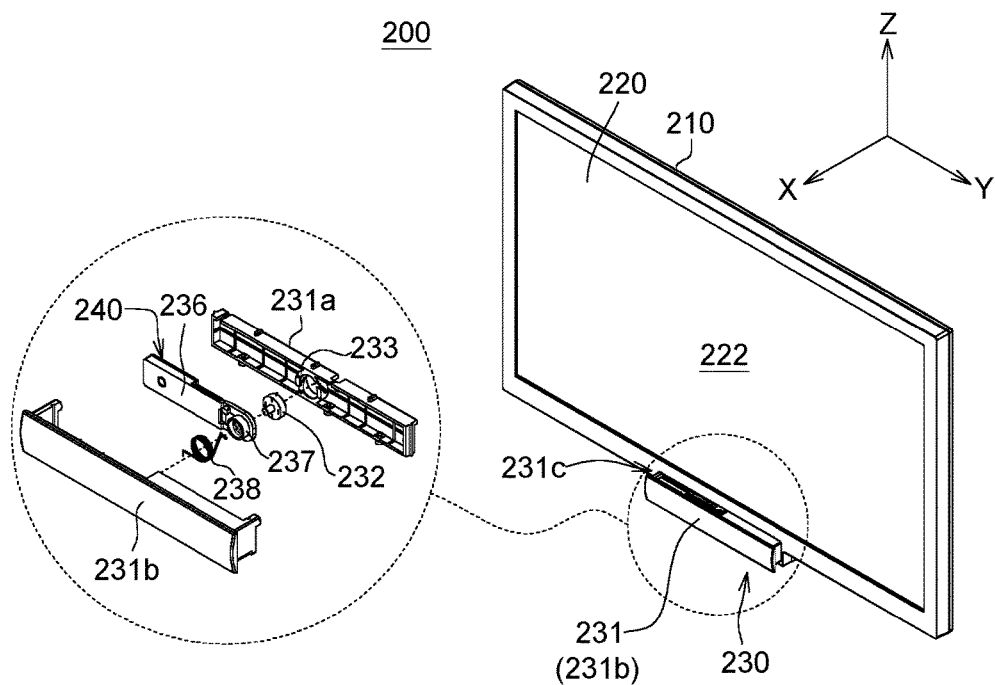

FIGS. 7-11 are schematic diagrams of the operation and components of a display device 200 according to a second embodiment of the invention. Refer to FIGS. 7 and 8. The display device 200 includes a housing 210, a display module 220, a carrier 230 and a color correction module 240. The housing 210 can be a hollowed rectangular frame. The display module 220 is disposed in the housing 210 and has a display plane 222 facing a first direction (that is, the +X direction) vertical to the display plane 222. Besides, the carrier 230 is connected to the housing 210 and disposed outside the housing 210. In the present embodiment, the carrier 230 is located at the bottom of the display device 200. However, the carrier 230 is not restrictively disposed at the bottom of the display device 200, and can also be disposed on the left-hand side, the right-hand side or the top of the display device 200.

Figure 9A:
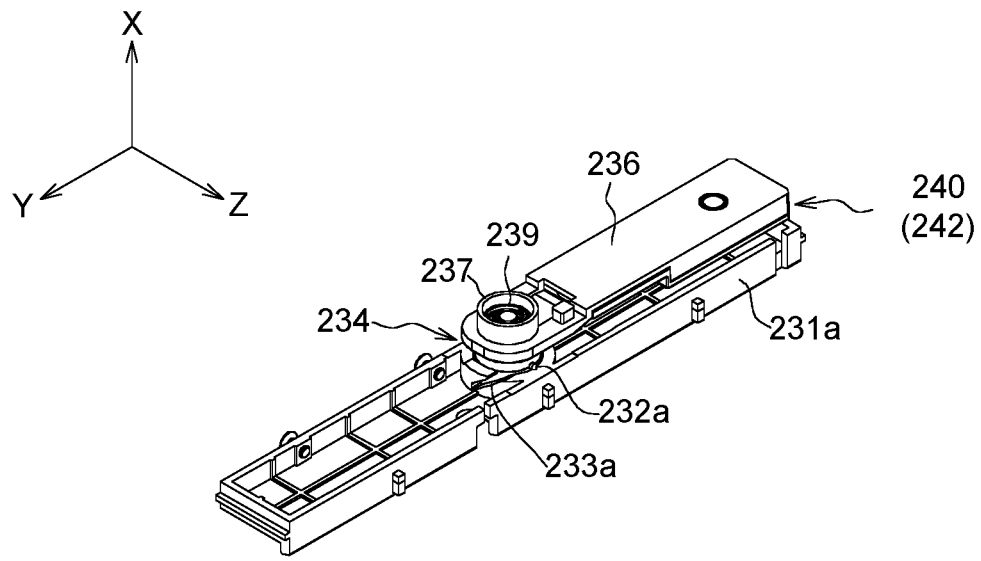

Refer to FIGS. 7, 8 and 9A. The carrier 230 includes a receiving box 231, a sliding structure 234 and a rotation structure 236. The receiving box 231 can be a drawer and has an opening 231c. When the carrier 230 is at the first position (FIG. 7), the receiving box 231 is not opened yet. The receiving box 231 is disposed on the outer side of the housing 210 for carrying the sliding structure 234, the rotation structure 236, and the color correction module 240 located on the rotation structure 236. As indicated in FIG. 8, when the receiving box 231 slides towards the +X direction, the receiving box 231 exposes an opening 231c with respect to the housing 210.

Figure 9B:
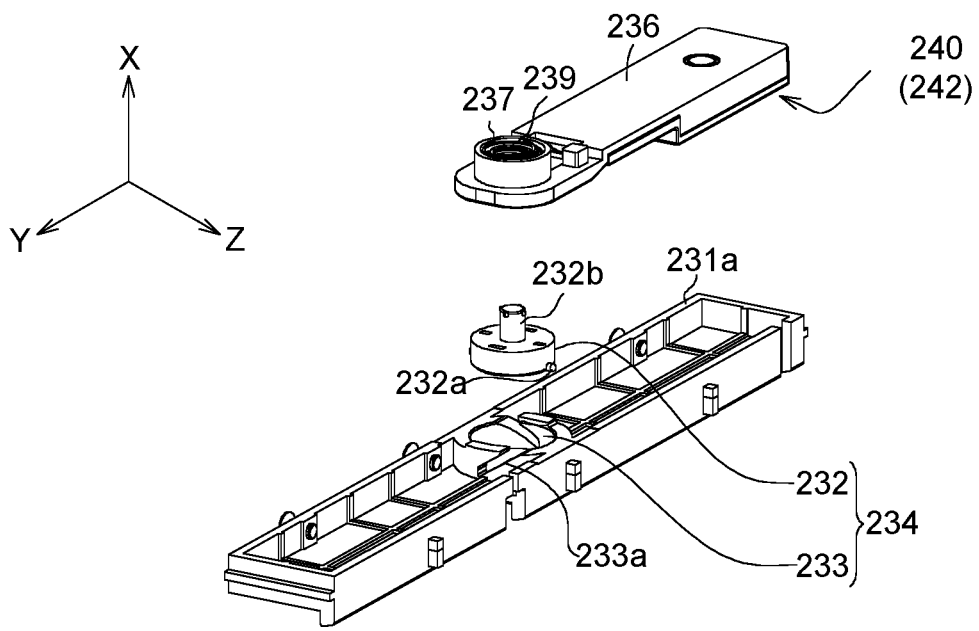

Referring to FIGS. 9A and 9B, an assembly diagram and an explosion diagram of a sliding structure 234 are respectively shown. The sliding structure 234 is disposed in the receiving box 231, and includes a shaft 232 and an opponent member 233. The shaft 232 and the opponent member 233 respectively have a lump 232a and a sliding recess 233a abutting against each other, and one of the lump 232a and the sliding recess 233a can rotate around the first direction (that is, the +X direction) and move along the second direction (that is, the −X direction).

In an embodiment, the outer circumferential surface of the shaft 232 of the sliding structure 234 has a lump 232a, and the opponent member 233 of the sliding structure 234 and the bottom plate 231a of the receiving box 231 are integrally formed in one piece to form a hollowed opening structure. In an embodiment, the opponent member 233 is a hollowed sleeve encapsulating the shaft 232 or other element opposite to the shaft 232, and the inner circumferential surface of the opponent member 233 has a sliding recess 233a which abuts the lump 232a and has a spiral shape. The sliding recess 233a, such as an inclined plane, is rotated around the first direction (that is, the +X direction) and extended towards the second direction (that is, the −X direction). Therefore, when the lump 232a on the shaft 232 is located in the sliding recess 233a, the lump 232a can be rotated inside the sliding recess 233a by an external force or an inbuilt elastic force, and can move along the second direction to move the color correction module 240 towards the display plane 222. The position of the lump 232a and that of the sliding recess 233a are interchangeable. In another embodiment (not shown), the outer circumferential surface of the shaft 232 has a sliding recess 233a, and the inner circumferential surface of the opponent member 233 has a lump 232a which abuts the sliding recess 233a. The sliding recess 233a on the shaft 232 can rotate around the first direction (that is, the +X direction) and move along the second direction (that is, the −X direction). In this way, the color correction module 240 can also be moved towards the display plane 222.

Refer to FIGS. 8, 9A and 9B. The rotation structure 236 is disposed on the shaft 232 and is connected to the color correction module 240. The rotation structure 236 can be a plate whose one end is fixedly connected to the axis 232b of the shaft 232 and the other end is fixedly connected to the color correction module 240. Moreover, the end through which the rotation structure 236 is connected to the shaft 232 further has a receiving member 237 for receiving an elastic member 239, such as a compression spring. One end of the elastic member 239 presses the front plate 231b, and the other end presses the rotation structure 236. Therefore, the end through which the rotation structure 236 is connected to the shaft 232 can be fixed on the axial direction of the shaft 232 by the elastic force of the elastic member 239. Also, as indicated in FIG. 8, one end of the elastic structure 238 is connected to the rotation structure 236, and the other end is connected to the front plate 231b of the receiving box 231. The elastic structure 238, such as a spiral spring or a torque spring, can store an elastic force and provide the stored elastic force to the rotation structure 236 to achieve the effect of automatic opening and rotation.

Figure 10:
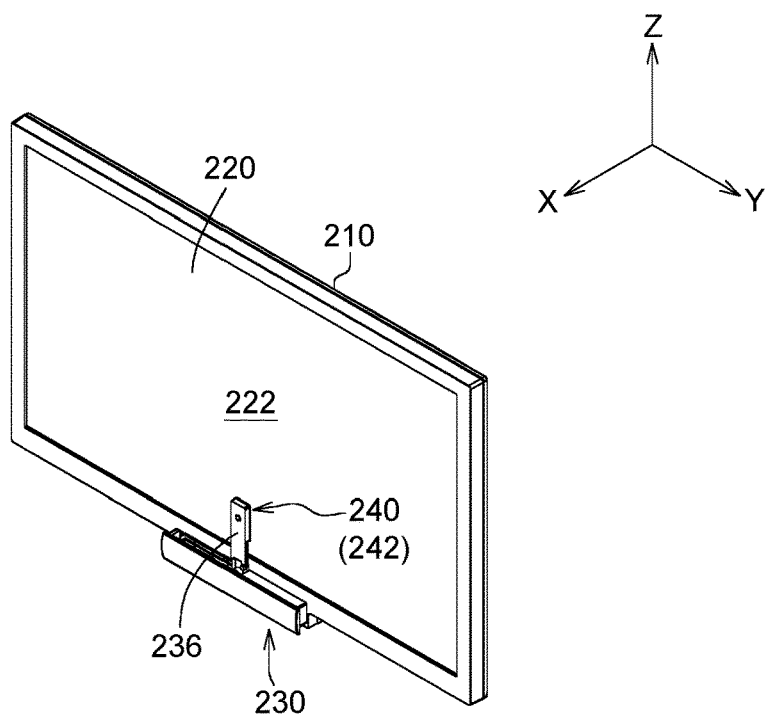
Figure 11:
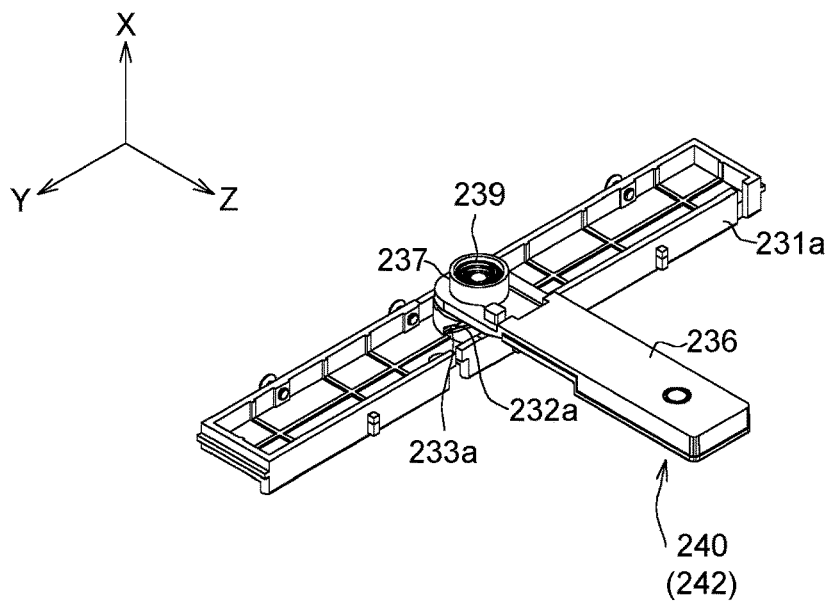

Refer to FIGS. 7 and 9A. When the receiving box 231 is at the first position, the sensing face 242 of the color correction module 240 and the display plane 222 are misaligned (not overlapping), and the sensing face 242 of the color correction module 240 faces to the second direction (that is, the −X direction). Meanwhile, the spiral spring is rotated inwards and becomes tightened to store an elastic force, and the rotation structure 236 is limited inside the receiving box 231 and cannot be ejected automatically. Refer to FIGS. 10 and 11. When the receiving box 231 moves along the +X direction, exposes an opening 231c, and reaches the second position, the spiral spring is rotated outwardly and becomes loosened to provide the stored elastic force to the rotation structure 236, such that the rotation structure 236 can be ejected automatically to move the sensing face 242 of the color correction module 240 to face the display plane 222 (overlapping).

Third Embodiment

Figure 12:
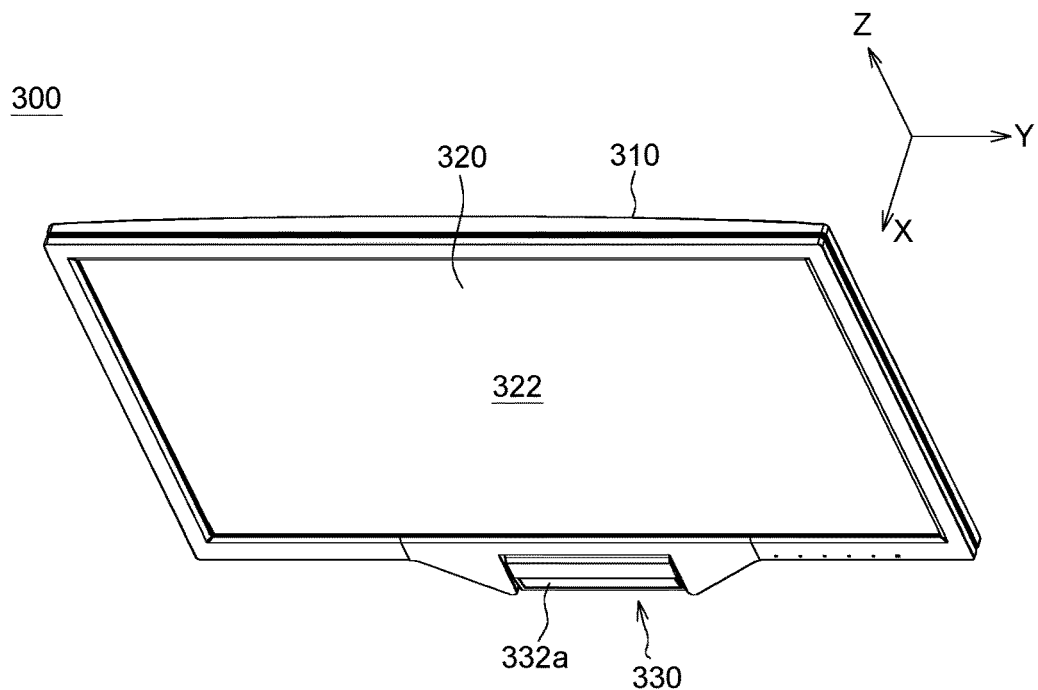
FIGS. 12-20 are schematic diagrams of the operation and components of a display device according to a third embodiment of the invention.

FIGS. 12-20 are schematic diagrams of the operation and components of a display device 300 according to a third embodiment of the invention. Refer to FIG. 12. The display device 300 includes a housing 310, a display module 320, a carrier 330 and a color correction module 340 (refer to FIG. 17). The housing 310 can be a hollowed rectangular frame. The display module 320 is disposed in the housing 310 and has a display plane 322 facing a first direction (that is, the +X direction) vertical to the display plane 322. Besides, the carrier 330 is disposed outside the housing 310 and connected to the housing 310 through a first shaft 331b (in FIG. 13). In the present embodiment, the carrier 330 is disposed at the bottom of the display device 300. However, the carrier 330 is not restricted to be disposed at the bottom of the display device 300, and can also be disposed on the left-hand side, the right-hand side or the top of the display device 300.

Figure 13:
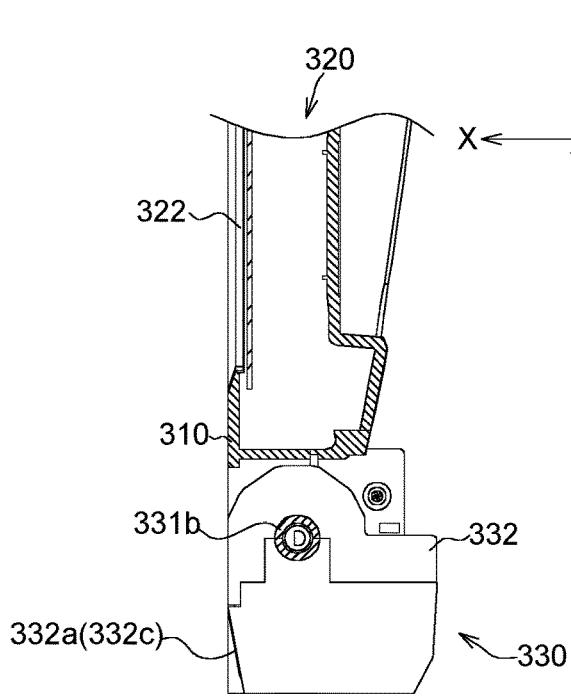
Figure 14:
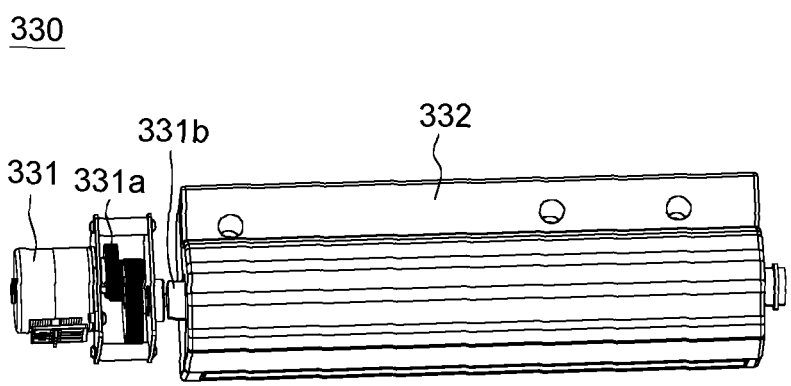

Refer to FIGS. 12, 13 and 14. FIG. 13 is a partial cross-sectional view of the display device 300. FIG. 14 is an external view of the carrier 330. The carrier 330 includes a first shaft 331b and a receiving body 332. The display device 300 includes a first driver 331, such as a servo motor disposed on the housing 310 and adjacent to one side of the receiving body 332. The first shaft 331b is connected to the first driver 331 of the housing 310, and the receiving body 332 is disposed on the first shaft 331b, such that the receiving body 332 can be connected to the first driver 331 through the first shaft 331b. As indicated in FIG. 14, a gear set 331a, such as a reduction gear set, is interposed between the first shaft 331b and the first driver 331 for driving the first shaft 331b and the receiving body 332 to rotate. The first shaft 331b has a first axial direction (that is, the +Y direction) parallel to the display plane 322. That is, the first shaft 331b substantially extends in a direction parallel to the lateral side of the housing 310. In an embodiment, the carrier 330 includes a cover 332a, which covers the opening 332c of the receiving body 332 to avoid dusts entering the receiving body 332. In another embodiment, the first driver 331, the gear set 331a can also be disposed on the receiving body 332, and the receiving body 332 is pivotally connected to the housing 310 through the first shaft 331b. In greater details, the first driver 331 and the gear set 331a can be implemented as a component which rotates with respect to the first shaft 331b and drives the receiving body 332 to rotate synchronously. The first shaft 331b is fixed on the housing 310, therefore the receiving body 332 can be pivotally connected to the housing 310 through the first shaft 331b.

Figure 16:
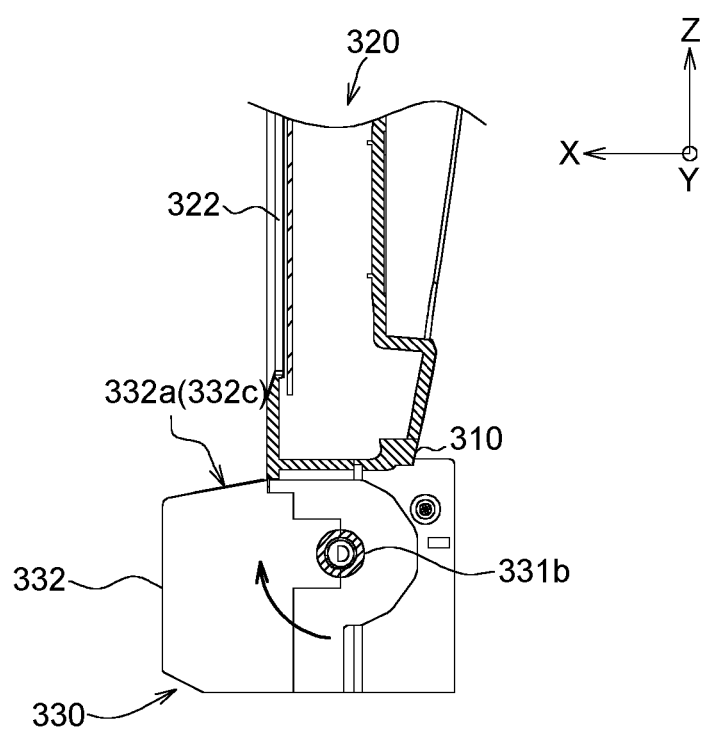

Refer to FIG. 13. When the carrier 330 is at the first position, the opening 332c of the receiving body 332 faces the first direction (that is, the +X direction), and is located at the bottom of the first shaft 331b. The cover 332a seals the receiving body 332. When the carrier 330 is at the first position, the sensing face 342 of the color correction module 340 faces to a third direction (that is, the +Z direction) vertical to the first direction (that is, the +X direction). Refer to FIG. 16. When the receiving body 332 is driven by the first driver 331 to rotate 90° around the first shaft 331b to reach the second position, the opening 332c of the receiving body 332 faces to the vertical direction (the +Z direction) and is exposed at the bottom of the housing 310 and protruded from the front of the display plane 322. In another embodiment, the receiving body 332 can be designed to be driven by the first driver 331 to rotate 180° around the first shaft 331b to reach the second position. For example, when the carrier 330 is at the first position, the opening 332c of the receiving body 332 faces to a fourth direction (that is, the −Z direction), and the sensing face 342 of the color correction module 340 faces to the first direction (that is, the +X direction). When the carrier 330 rotates 180° to reach the second position, the opening 332c of the receiving body 332 faces to the third direction (that is, the +Z direction), and the sensing face 342 of the color correction module 340 faces to the second direction (that is, the −X direction).

Figure 15:
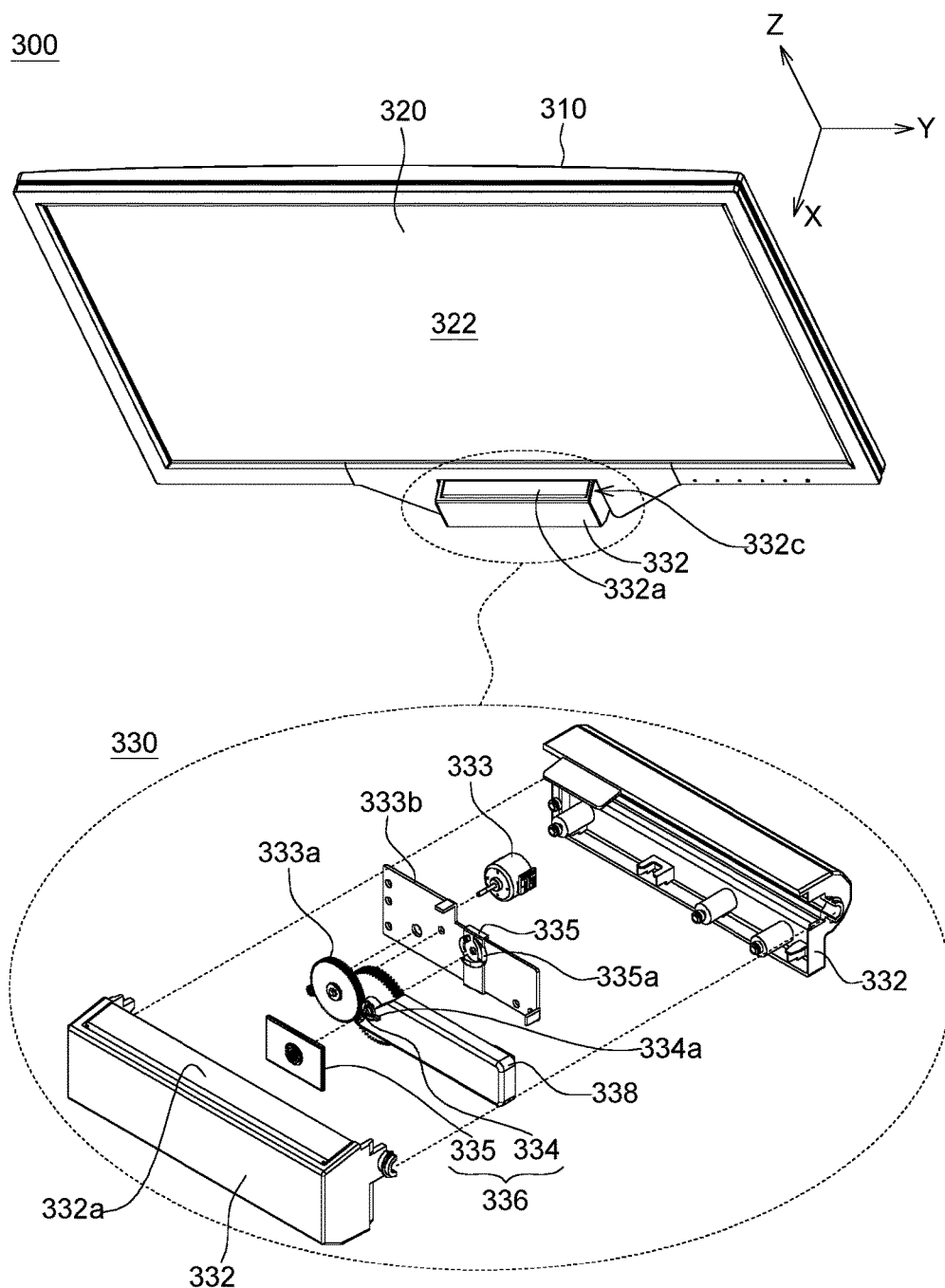
Figure 17:
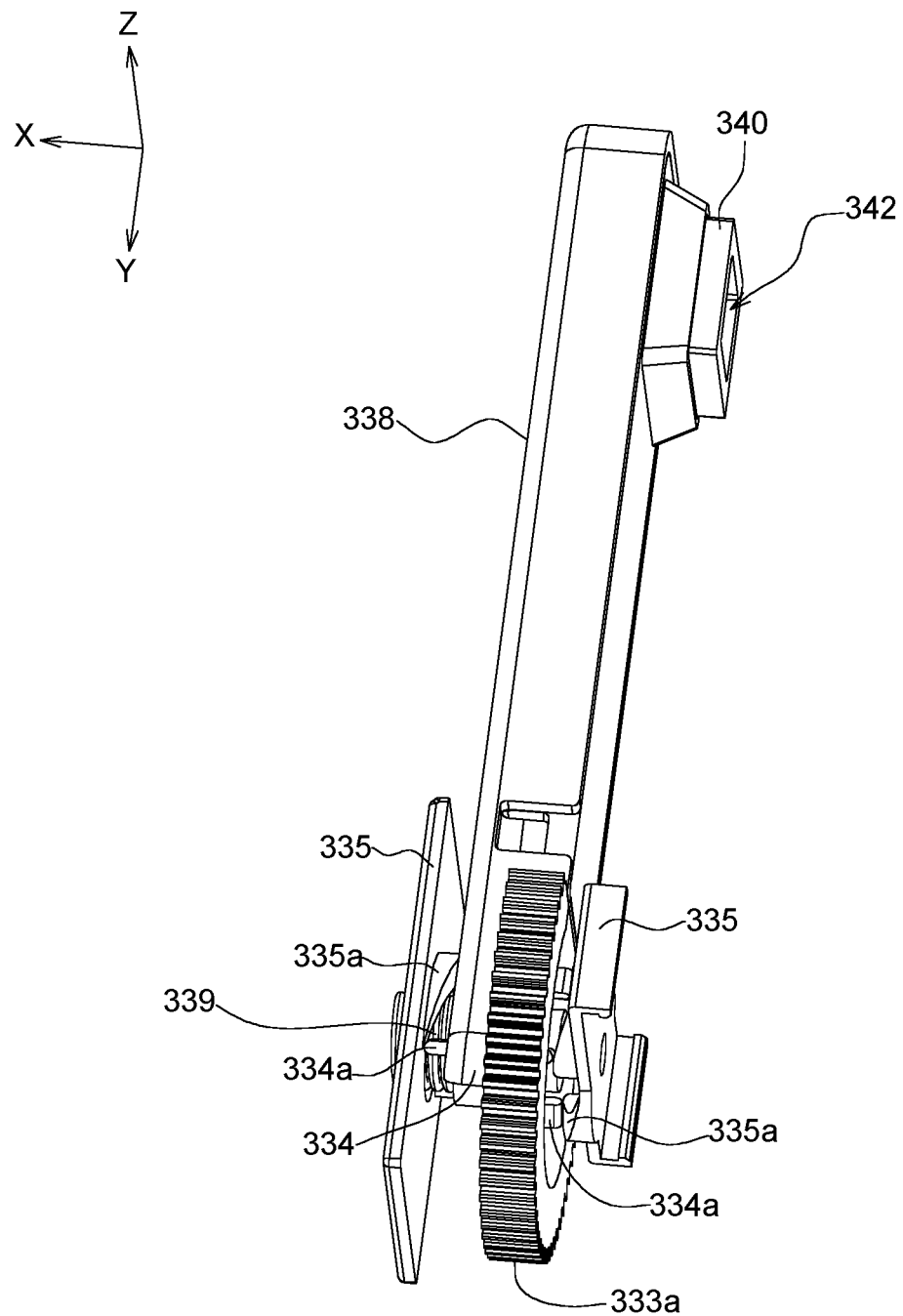

Refer to FIGS. 15, 16 and 17. The receiving body 332 of the carrier 330 further includes a second driver 333, a sliding structure 336 and a rotation structure 338. The second driver 333, such as a servo motor, is disposed on a supporting member 333b. The sliding structure 336 includes an opponent member 335 and a second shaft 334. The second shaft 334 is connected to the second driver 333. In an embodiment, a gear set 333a, such as a reduction gear set, is interposed between the second shaft 334 and the second driver 333 for driving the second shaft 334 and the rotation structure 338 to rotate. The rotation structure 338, such as a plate, is disposed on the second shaft 334 and connected to the color correction module 340. That is, one end of the rotation structure 338 is fixedly connected to the second shaft 334, and the other end is fixedly connected to the color correction module 340. The second shaft 334 is basically vertical to the first shaft 331b.

The second shaft 334 and the opponent member 335 respectively have a lump 334a and a sliding recess 335a abutting against each other, and one of the lump 334a and the sliding recess 335a can rotate around the first direction (that is, the +X direction) and move along the second direction (that is, the −X direction). Refer to FIG. 17. In an embodiment, the second shaft 334 of the sliding structure 334 has a lump 334a, and the opponent member 335 can be a set of bottom plates opposite to the second shaft 334. The surface of the opponent member 335 has a sliding recess 335a, which abuts the lump 334a and has a spiral shape. The sliding recess 335a can be realized by an inclined plane, which is rotated around the first direction (that is, the +X direction) and extended towards the second direction (that is, the −X direction). Therefore, when the lump 334a on the second shaft 334 is located on the inclined plane, the lump 334a can rotate along the inclined plane and move along the second direction to move the color correction module 340 towards the display plane 322. The position of the lump 334a and that of the sliding recess 335a are interchangeable. In another embodiment (not shown), the second shaft 334 has a sliding recess 335a, and the opponent member 333 has a lump 334a, which abuts the sliding recess 335a. The sliding recess 335a on the second shaft 334 can rotate around the first direction (that is, the +X direction) and move along the second direction (that is, the −X direction). In this way, the color correction module 340 can also be moved towards the display plane 322. Furthermore, an elastic member 339, such as a compression spring, is disposed on the axial direction of the second shaft 334. One end of the elastic member 339 presses the opponent member 335, and the other end presses the rotation structure 338. Therefore, the end through which the rotation structure 338 is connected to the second shaft 334 can be firmly fixed on the axial direction of the second shaft 334 by the elastic force of the elastic member 339.

Figure 18:
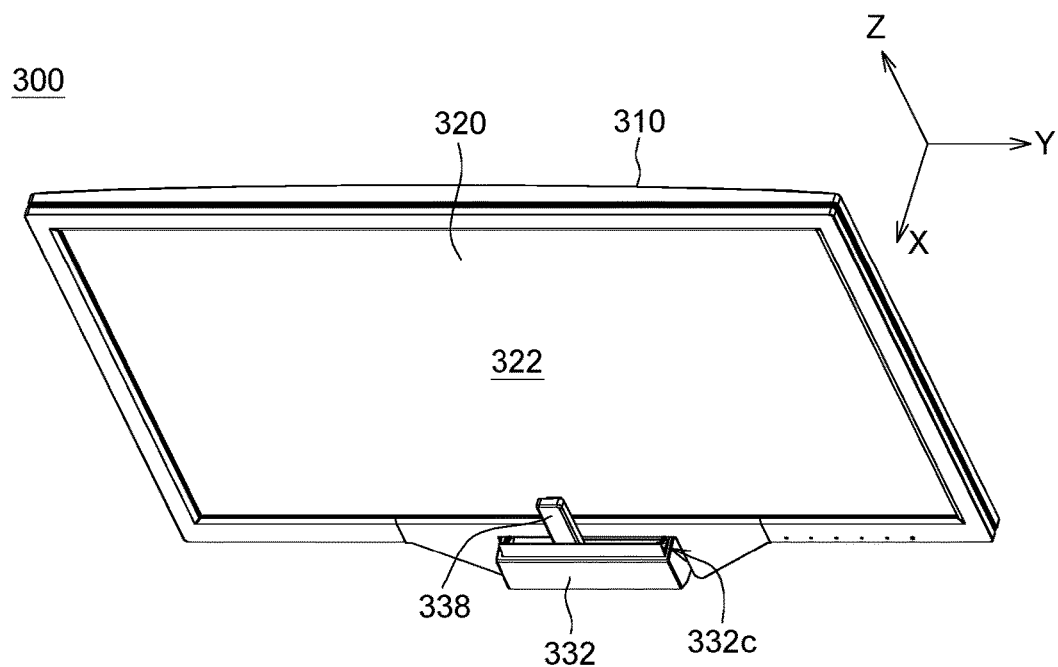
Figure 19:
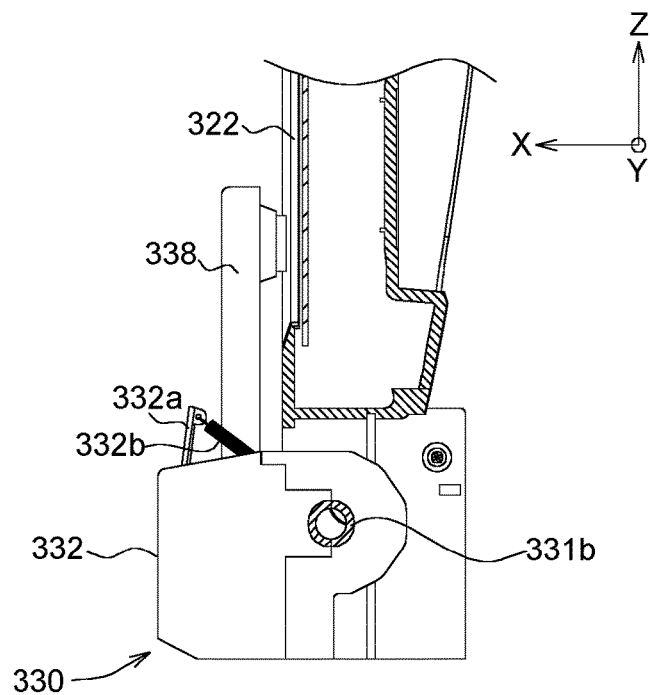
Figure 20:
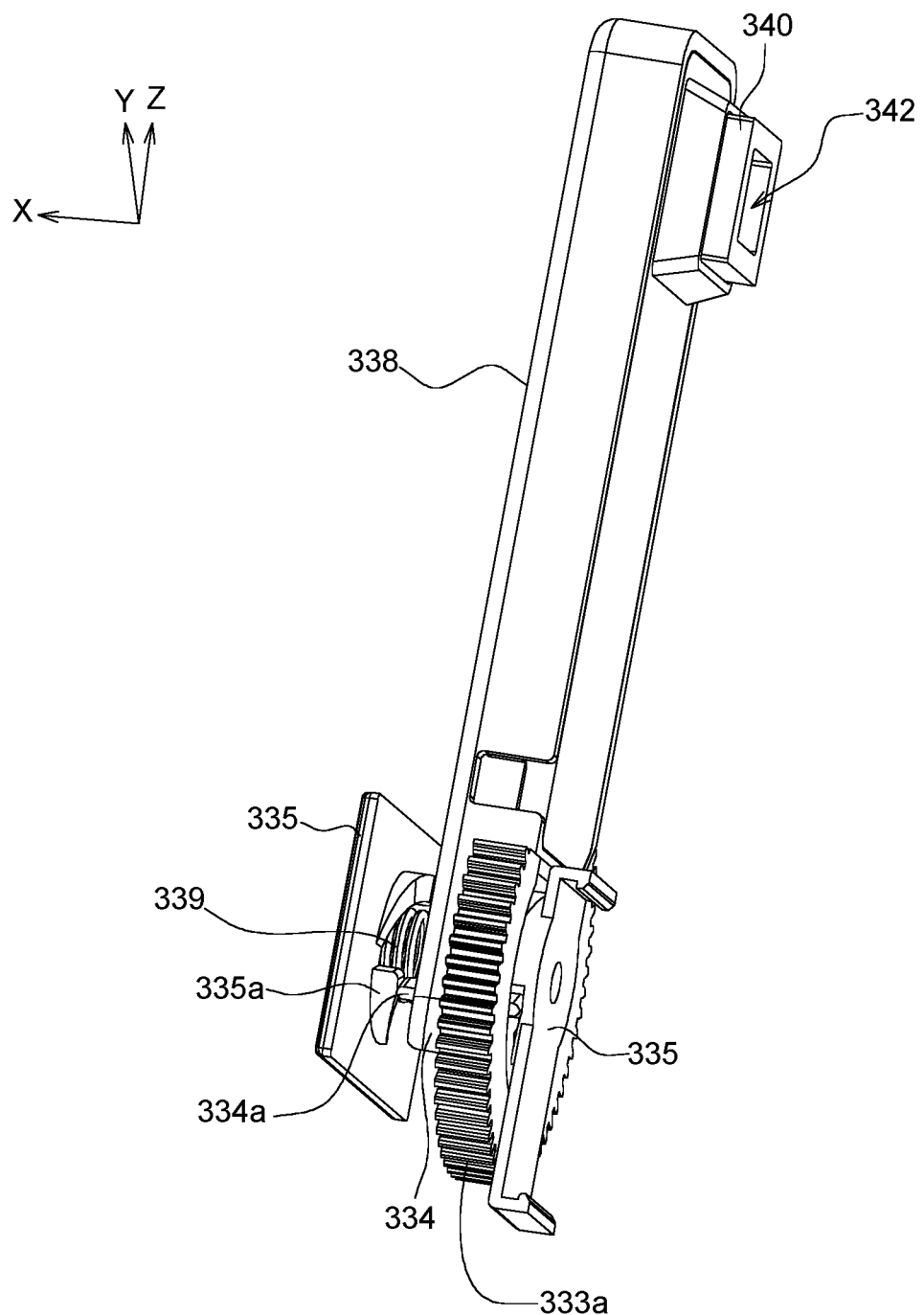

Refer to FIGS. 15 and 17. When the receiving body 332 is at the second position, the sensing face 342 of the color correction module 340 and the display plane 322 are misaligned (not overlapping), and the sensing face 342 of the color correction module 340 faces to the second direction (that is, the −X direction). Meanwhile, the second driver 333 does not drive the second shaft 334 to rotate, so the rotation structure 338 is limited inside the receiving body 332 and cannot be ejected automatically. Refer to FIGS. 18, 19 and 20. When the receiving body 332 is at the second position and the second driver 333 drives the second shaft 334 and the rotation structure 338 to rotate, the sensing face 342 of the color correction module 340 is moved to face the display plane 322 (overlapping) along with the rotation of the rotation structure 338. As indicated in FIGS. 18 and 19, the carrier further includes a spring 332b, which is connected to the cover 332a and the receiving body 332. The cover 332a is pivotally connected to the receiving body 332, and covers the opening 332c. The cover 332a can be lifted by a +Z directional force applied by the rotation structure 338. When the rotation structure 338 is reversed by the second driver 333 and is again received in the receiving body 332, the cover 332a can be pulled back by the elastic force of the spring 332b to cover the opening 332c.

In the present embodiment, once the receiving body 332 is driven by the first driver 331 to rotate around the Y axis, the rotation structure 338 is driven by the second driver 333 to rotate around the X axis to control the rotation angle. Therefore, the step of rotating the carrier 330 to the position as illustrated in FIG. 15 (the opening 332c faces upwards) does not have to be performed before the step of rotating the rotation structure 338 to the vertical direction as illustrated in FIG. 18. It should be understood that the second driver 333 can rotate the rotation structure 338 without waiting until the receiving body 332 has been rotated to the second position (FIG. 15). In another embodiment, the first driver 331 drives the receiving body 332 to rotate around the Y axis only after the second driver 333 has driven the rotation structure 338 to rotate around the X axis.

A display device with color correction function is disclosed in above embodiments of the invention. A movable carrier is disposed outside the housing or on a back side of the display module. A carrier is selectively disposed at a first position or a second position with respect to the housing. When the carrier is at the first position, the sensing face of the color correction module staggers with or backs on the display plane. When the carrier is at the second position, the sensing face of the color correction module is moved to face the display plane by the movable carrier. Besides, the color correction module can generate spiral rotation by using the sliding structure and the rotation structure disposed on the carrier (translated and rotated), such that the color correction module after spiral rotation is closer to the display plane, not only avoiding the sensor of the color correction module being distorted due to the interference of the ambient light, but also enhancing the correction quality of the display device.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a housing;
   a display module disposed on the housing, wherein the display module exposes a display plane facing a first direction vertical to the display plane;
   a carrier movably connected to the housing and disposed outside the housing or on a back side of the display module, wherein the back side faces to a second direction opposite to the first direction; and
   a color correction module disposed on the carrier and having a sensing face,
   wherein, the carrier is selectively disposed at a first position or a second position with respect to the housing, and when the carrier is at the second position, the sensing face of the color correction module is moved to face the display plane.

2. The display device according to claim 1, wherein when the carrier is at the first position, the sensing face of the color correction module and the display plane are misaligned or the sensing face and the display plane are back-to-back.

3. The display device according to claim 1, wherein the carrier is disposed on the back side of the display module, the sensing face faces to the second direction, and when the carrier is at the second position, the sensing face of the color correction module is moved to face the display plane from the back side of the display module.

4. The display device according to claim 3, wherein the carrier comprises:
   a moving structure having a first end and a second end, wherein the first end is connected to the back side of the display module, and the second end is extended outside the housing with respect to first end;
   a sliding structure disposed at the second end and having a sliding recess and a sliding rod, wherein the sliding rod is disposed inside the sliding recess and can move along the first direction or the second direction; and
   a rotation structure disposed on the sliding rod and movably connected to the color correction module and the sliding rod, wherein the rotation structure can rotate around the first direction, such that the sensing face is moved to face the display plane.

5. The display device according to claim 4, wherein the sliding recess has a plurality of positioning points disposed therein, and the sliding rod is engaged with one of the positioning points to be fixed in the sliding recess.

6. The display device according to claim 1, wherein when the carrier is disposed outside the housing, the carrier comprises:
   a receiving box connected to the housing and having an opening, wherein when the receiving box is at the second position, the receiving box exposes the opening with respect to the housing;
   a sliding structure disposed in the receiving box and comprising a shaft and an opponent member, wherein the shaft and the opponent member respectively have a lump and a sliding recess abutting against each other, and one of the lump and the sliding recess can rotate around the first direction and move along the second direction; and
   a rotation structure disposed on the shaft and connected to the color correction module, wherein the color correction module rotates around the first direction and moves along the second direction along with the shaft, and the sensing face is moved to face the display plane.

7. The display device according to claim 6, further comprising an elastic structure connected to the rotation structure and the receiving box, wherein the elastic structure is for storing an elastic force, and when the receiving box exposes the opening, the elastic structure provides the stored elastic force to the rotation structure to move the sensing face of the color correction module to face the display plane.

8. The display device according to claim 6, wherein the lump is disposed on the shaft, and the sliding recess is disposed on the opponent member; or, the lump is disposed on the opponent member, and the sliding recess is disposed on the shaft.

9. The display device according to claim 6, wherein when the carrier is at the first position, the sensing face of the color correction module faces to the second direction.

10. The display device according to claim 1, wherein the carrier is disposed outside the housing, the display device has a first driver, and the carrier comprises:
    a first shaft connected to the first driver and the housing, wherein the first shaft has a first axial direction parallel to the display plane;
    a receiving body disposed on the first shaft, wherein the receiving body is driven by first driver to rotate around the first shaft to reach the second position;
    a second driver disposed in the receiving body;
    a sliding structure disposed in the receiving body and comprising an opponent member and a second shaft, wherein the second shaft is connected to the second driver, the second shaft and the opponent member respectively have a lump and a sliding recess abutting against each other, and one of the lump and the sliding recess can rotate around the first direction and move along the second direction; and
    a rotation structure disposed on the second shaft and connected to the color correction module, wherein the color correction module rotates around the first direction and moves along the second direction along with the second shaft, and the sensing face is moved to face the display plane.

11. The display device according to claim 10, wherein the lump is disposed on the second shaft, and the sliding recess is disposed on the opponent member; or, the lump is disposed on the opponent member, and the sliding recess is disposed on the second shaft.

12. The display device according to claim 10, wherein the first driver is disposed on the housing or the receiving body.

13. The display device according to claim 10, wherein when the carrier is at the first position, the sensing face of the color correction module faces to the third direction vertical to the first direction.

14. The display device according to claim 10, wherein the carrier comprises:
    a cover pivotally connected to the receiving body; and
    a spring connected to the cover and the receiving body;
    wherein, when the carrier is at the first position, the cover seals the receiving body.

* * * * *